United States Patent
Mitterbacher

(10) Patent No.: US 9,445,464 B2
(45) Date of Patent: Sep. 13, 2016

(54) METHOD AND CIRCUIT ARRANGEMENT FOR OPERATING LIGHT-EMITTING MEANS WITH A SUDDEN LOAD VARIATION

(71) Applicant: TRIDONIC GMBH & CO KG, Dornbirn (AT)

(72) Inventor: Andre Mitterbacher, Dornbirn (AT)

(73) Assignee: TRIDONIC GMBH & CO KG, Dornbirn (AT)

(*) Notice: Subject to any disclaimer, the term of this patent is extended or adjusted under 35 U.S.C. 154(b) by 0 days.

(21) Appl. No.: 14/367,373

(22) PCT Filed: Dec. 20, 2012

(86) PCT No.: PCT/EP2012/076363
§ 371 (c)(1),
(2) Date: Jun. 20, 2014

(87) PCT Pub. No.: WO2013/092847
PCT Pub. Date: Jun. 27, 2013

(65) Prior Publication Data
US 2014/0361707 A1  Dec. 11, 2014

(30) Foreign Application Priority Data

Dec. 23, 2011 (DE) .......... 10 2011 089 815
Apr. 18, 2012 (DE) .......... 10 2012 206 349

(51) Int. Cl.
*H05B 41/16* (2006.01)
*H05B 33/08* (2006.01)

(52) U.S. Cl.
CPC ...... *H05B 33/0815* (2013.01); *H05B 33/0845* (2013.01); *H05B 33/0848* (2013.01)

(58) Field of Classification Search
USPC ............. 315/209 R, 247, 287, 291, 307, 308
See application file for complete search history.

(56) References Cited

U.S. PATENT DOCUMENTS 7,042,743 B2 *  5/2006  Pidutti et al. ............... 363/89
7,135,845 B2 * 11/2006  Zverev et al. ............. 323/284

(Continued)

FOREIGN PATENT DOCUMENTS

| DE | 102008057333 A1 | 5/2010 |
|----|-----------------|--------|
| EP | 2043242 A2 | 4/2009 |

(Continued)

*Primary Examiner* — Thuy Vinh Tran
(74) *Attorney, Agent, or Firm* — Volpe and Koenig, P.C.

(57) ABSTRACT

An operating circuit for light-emitting means (18), in particular an LED string, contains an actively clocked power factor correction circuit (11), which produces a regulated output voltage ($U_{BUS}$), by means of which the light-emitting means (18) are supplied directly or indirectly via at least one further converter stage (17). The regulation is performed by means of a control unit (16), which, as manipulated variable ($t_{ON}$), actuates clocking of a switch of the power factor correction circuit (11). The operating circuit is designed, in the event of the presence of a predefined event, for example a rapid or sudden change in the energy demand of the light-emitting means (18), selectively: —to change suddenly the value of the manipulated variable ($t_{ON}$) using feedforward control, and/or —to vary the time constant of the control loop of the output voltage ($U_{BUS}$).

7 Claims, 3 Drawing Sheets

(56) References Cited

U.S. PATENT DOCUMENTS

| | | |
|---|---|---|
| 7,848,117 B2 * | 12/2010 | Reinberger et al. ............ 363/16 |
| 2002/0175747 A1 | 11/2002 | Tang et al. |
| 2005/0219872 A1 | 10/2005 | Lys |
| 2007/0236200 A1 | 10/2007 | Canfield et al. |
| 2010/0308742 A1 | 12/2010 | Melanson |
| 2011/0241569 A1 * | 10/2011 | Zimmermann .... H05B 33/0815 315/301 |
| 2015/0311808 A1 * | 10/2015 | Shteynberg ........ H05B 33/0815 315/307 |

FOREIGN PATENT DOCUMENTS

| | | |
|---|---|---|
| EP | 2296449 A1 | 3/2011 |
| WO | 2010121968 A1 | 10/2010 |
| WO | 2011045372 A1 | 4/2011 |
| WO | 2011109210 A1 | 9/2011 |

* cited by examiner

METHOD AND CIRCUIT ARRANGEMENT FOR OPERATING LIGHT-EMITTING MEANS WITH A SUDDEN LOAD VARIATION

FIELD OF THE INVENTION

The invention relates to a method and a circuit arrangement for operating light-emitting means, in particular a load, which perform rapid sudden power variations.

BACKGROUND

In order to operate LED luminaires, generally power-factor-corrected switched mode power supplies are used. Since an LED string, in particular a dimmable LED string, does not represent a constant load, these switched mode power supplies are generally subjected to closed-loop control. For this, monitoring of the output voltage of the switched mode power supply is generally carried out. This output voltage is used as controlled variable. In order to achieve a favorable power factor and a low level of feedback onto the electrical grid, this closed-loop control generally has a very high time constant. Thus, the controller generally operates at <20 Hz, for example. Closed-loop control which implements changes in the power factor during an entire oscillation of the line voltage would result in a less favorable power factor and thus in an increased level of feedback onto the electrical grid.

In particular in the case of rapid changes in load, for example in the case of sudden connection, disconnection or dimming of an LED string, the conventional slow closed-loop control cannot follow. This results in a marked fluctuation in the output voltage of the switched mode power supply.

For example, WO 2011/045372 A1 discloses an operating circuit for operating LED modules. A DC voltage is generated from an AC voltage by means of power factor correction in said document. In particular in the case of rapid changes in load, however, a fluctuation in the output voltage results.

The present invention is based on the object of providing a method and a circuit arrangement which ensure safe and fault-free operation of a rapidly changing load.

SUMMARY

An operating circuit according to the invention for light-emitting means, in particular an LED string, contains an actively clocked power factor correction circuit, which generates a controlled output voltage, by means of which the light-emitting means are supplied directly or indirectly via at least one further converter stage. The closed-loop control takes place by means of a control unit, which, as manipulated variable, drives the clocking of a switch of the power factor correction circuit. The operating circuit is configured, in the event of the presence of a predefined event, for example a rapid or sudden change in the energy requirement of the light-emitting means, selectively:
 to vary the value of the manipulated variable suddenly with feed-forward control, and/or
 to vary the time constant of the control loop of the output voltage. It is thus possible to keep the operating voltage constant and thus to ensure safe operation.

Preferably, the control unit contains a subtractor, which forms a difference between a power consumed at present by the light-emitting means and a power consumed by the light-emitting means after a change in power. The control unit preferably detects the predefined event depending on the difference. Thus, it is possible to determine in a very simple and flexible manner when intervention in the conventional closed-loop control is necessary.

Advantageously, the control unit contains a comparator, which compares the previously determined difference with at least one threshold value and detects the predefined event depending on the comparison. Thus, it is possible to determine in a yet simpler manner when intervention in the conventional closed-loop control is necessary.

Preferably, the operating circuit is configured to increase the value of the manipulated variable suddenly with feed-forward control in the event of the presence of a rapid or sudden increase in the energy requirement of the light-emitting means, and to reduce the value of the manipulated variable suddenly with feed-forward control in the event of the presence of a rapid or sudden reduction in the energy requirement of the light-emitting means. It is thus possible to compensate for a sudden load variation safely.

Alternatively, the operating circuit is configured to reduce the time constant of the control loop of the output voltage in the event of the presence of a rapid or sudden increase in the energy requirement of the light-emitting means, and to reduce the time constant of the control loop of the output voltage in the event of the presence of a rapid or sudden reduction in the energy requirement of the light-emitting means. It is thus likewise possible to compensate for a sudden load variation safely.

Furthermore, the control unit is preferably configured to determine the value of the manipulated variable or the time constant of the control loop by means of a calculation specification or by reading from a table in the event of the presence of the predefined event. Thus, intervention in the closed-loop control can be determined with a low memory space requirement or with little computation load.

A method according to the invention is used for operating light-emitting means, in particular LED strings. A controlled output voltage is generated by means of actively clocked power factor correction. By means of said output voltage, the light-emitting means are supplied directly or indirectly. The closed-loop control uses, as manipulated variable, the clocking of the power factor correction. In the event of the presence of a predefined event, for example a rapid or sudden change in the energy requirement of the light-emitting means (18), selectively:
 the value of the manipulated variable ($t_{ON}$) is changed suddenly with feed-forward control, and/or
 the time constant of the control loop of the output voltage ($U_{BUS}$) is changed. It is thus possible to keep the operating voltage constant and thus to ensure safe operation.

BRIEF DESCRIPTION OF THE DRAWINGS

The invention will be described below by way of example with reference to the drawing, which illustrates an advantageous exemplary embodiment of the invention. In the drawing.

DETAILED DESCRIPTION OF THE PREFERRED EMBODIMENTS

First, details will be given, with reference to FIG. 1, of the general design and the general mode of operation of the circuit arrangement according to the invention on the basis of an exemplary embodiment. Then, the detailed operation of a controller within a further exemplary embodiment of the present invention will be illustrated by means of FIG. 2. Finally, the mode of operation of exemplary embodiments of the method according to the invention will be illustrated with reference to FIG. 2 and FIG. 3. Similar features have not been illustrated and described repeatedly in similar figures.

Figure 1:
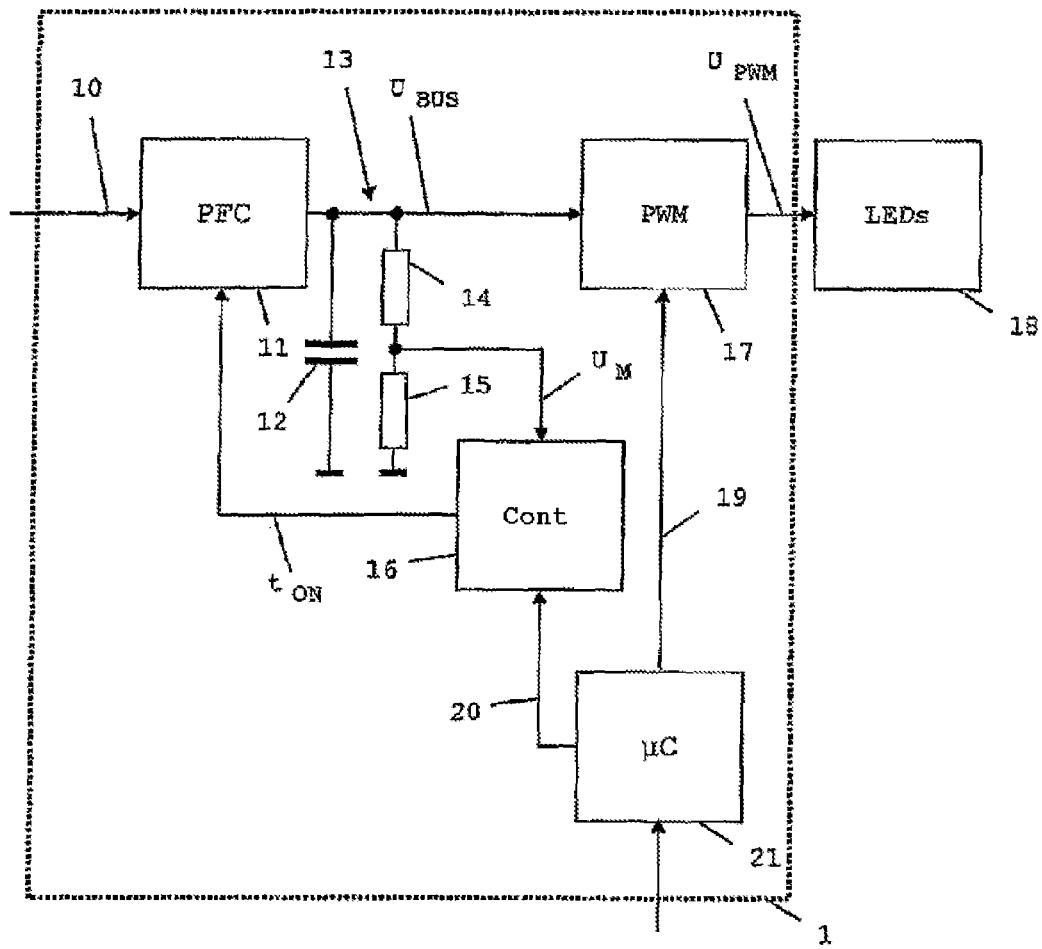
FIG. 1 shows a first exemplary embodiment of the circuit arrangement according to the invention.

FIG. 1 shows a first exemplary embodiment of the circuit arrangement according to the invention. An operating circuit 1 comprises a power factor correction circuit 11, which is connected to a mains connection 10. A smoothing capacitor 12 is connected to an output of the power factor correction circuit 11. The output of the power factor correction circuit 11 is furthermore connected to a voltage divider 13. The voltage divider 13 in this case comprises ohmic resistors 14 and 15. The ohmic resistor 14 is in this case connected to the output of the power factor correction circuit 11 and to the ohmic resistor 15. The ohmic resistor 15 is furthermore connected at its other end to ground. The output of the power factor correction circuit 11 is furthermore connected to a pulse width modulator 17. An output of the pulse width modulator 17 is connected to an LED module 18.

The center point of the voltage divider 13 is furthermore connected to a control unit 16. In turn, the control unit 16 is connected to the power factor correction circuit 11. Furthermore, the operating circuit 1 comprises a microcontroller 21. The microcontroller 21 is connected to the control unit 16 and to the pulse width modulator 17. Optionally, the microcontroller 21 is additionally connected to the power factor correction circuit 11.

The power factor correction circuit 11 implements an actively clocked power factor correction of the line signal, which is present at the mains connection 10. That is to say that the power factor correction circuit 11 selects individual segments of each oscillation of the line signal and outputs these at its output. The smoothing capacitor 12, which is additionally connected to ground, smooths the signal output by the power factor correction circuit 11. Thus, a DC voltage $U_{BUS}$ is produced. The DC voltage $U_{BUS}$ is supplied to the pulse width modulator 17. Said pulse width modulator performs a pulse width modulation of the DC voltage $U_{BUS}$ and thus generates a pulse-width-modulated DC voltage $U_{PWM}$. The output signal $U_{PWM}$ of the pulse width modulator 17 is output to the LED module 18. The pulse width modulator and the LED module are not critical for the present invention. A load which is different than the LED module can also be used. Pulse width modulation is not absolutely necessary. Alternatively, amplitude modulation or else another form of pulse modulation can also take place. Preferably, the pulse width modulator 17 is in the form of a switching controller with radiofrequency clocking. In this case, it may be a single-stage or multi-stage converter, for example a flyback converter (isolated flyback converter), buck converter (step-down converter), resonant half-bridge converter (preferably with electrical isolation) or a series circuit comprising such or similar converter topologies. The DC voltage signal $U_{BUS}$ can also be used directly for operating the load, wherein a linear controller, for example, can then be provided for matching or a switch can be provided for interrupting the LED current.

The voltage divider 13 divides the output voltage $U_{BUS}$ of the power factor correction circuit 11 according to the ratio of the values of the ohmic resistors 14 and 15. The resultant signal $U_M$ is supplied as controlled variable to the control unit 16. Depending on the controlled variable $U_M$, the control unit generates a manipulated variable $t_{ON}$ and transmits it to the power factor correction circuit 11. The control unit 16 therefore controls the output voltage $U_{BUS}$. In order to achieve a power factor which is as good as possible, the closed-loop control 16 in this case operates at a frequency which is much lower than the line frequency at the mains connection 10. Preferably, the closed-loop control operates at a frequency of <50 Hz, particularly preferably <20 Hz.

The microcontroller 21 receives signals which initiate a change in the power consumed at present by the LED string 18 and transmits a corresponding dimming signal 19 to the pulse width modulator 17. Instead of a pulse width modulator 17 and an LED module 18, it is also possible for a different adjustable light-emitting means to be used. It is merely important that the microcontroller 21 sets the power consumed at present. In this case, the microcontroller 21 processes, for example, signals in accordance with the DALI standard. A connection of a plurality of independent loads to the power factor correction circuit is also conceivable. The microcontroller 21 then controls at least one, preferably the majority of, particularly preferably all of the connected loads.

The microcontroller 21 additionally communicates the pending sudden load variation via a control signal 20 to the control unit 16. Preferably, the control signal 20 contains the level and the direction of the pending sudden load variation. Alternatively, it always communicates the present power requirement. As soon as the microcontroller 21 notifies the control unit 16 of such a sudden load variation, the closed-loop control is influenced. This can take place in two different ways.

A first option is to accelerate the closed-loop control. In this case, the control unit 16 reduces the time constant of the closed-loop control in order to match the manipulated variable signal $t_{ON}$ to the changed power requirement of the LED string 18. Otherwise, the closed-loop control by the controller 16 remains unchanged. Owing to the acceleration of the closed-loop control, however, an unfavorable power factor is caused for a short period of time, and this is accepted. The unfavorable power factor is there as long as the closed-loop control is proceeding in the accelerated state. The closed-loop control then operates at >20 Hz, preferably at >50 Hz, particularly preferably at >200 Hz.

A second possibility is temporary bypassing of the conventional closed-loop control. In this case, feed-forward control of the closed-loop control by the control unit 16 takes place. More details will be given with reference to FIG. 2 of the detailed configuration of this option.

With this second option too, an unfavorable power factor is accepted for a short period of time in order to keep the output voltage of the power factor correction circuit stable. The power factor in this second case is in an unfavorable range for a much shorter period of time than is the case for the first option. During this very short period of time, the power factor is much less favorable than in the first option, however.

As already explained, the closed-loop control operating mode may, however, be subject to excessive demands in the case of rapid load changes. The control unit 16 therefore determines a feed-forward coupling selection signal on the basis of the information in respect of the power requirement which is transmitted by the microcontroller 21 and transmits this feed-forward coupling selection signal to a selection device. Said feed-forward coupling selection signal is used for selecting between the just-illustrated conventional closed-loop control operating mode and feed-forward coupling. In addition, the control unit 16 determines a feedforward coupling signal and supplies this to the selection device. The feed-forward coupling signal corresponds to a manipulated variable, which is applied to the closed-loop control. If the feed-forward coupling selection signal indicates a feed-forward coupling operating mode, the selection device feeds the feed-forward coupling signal back via the delay element. The control unit 16 therefore no longer feeds back its own output signal. The operating mode illustrated here corresponds to the second option, which has already been represented with reference to FIG. 1.

The feed-forward coupling signal is in this case either calculated by a computation specification or read from a stored table. The feed-forward coupling signal is in this case dependent on the variable of the sudden load variation and on its direction.

In particular when sudden load variations are intended to be compensated for by pulse width modulation, a constant value can be set for the feed-forward coupling. The sudden load variations in the case of pulse width modulation always take place over the same level.

Figure 2:
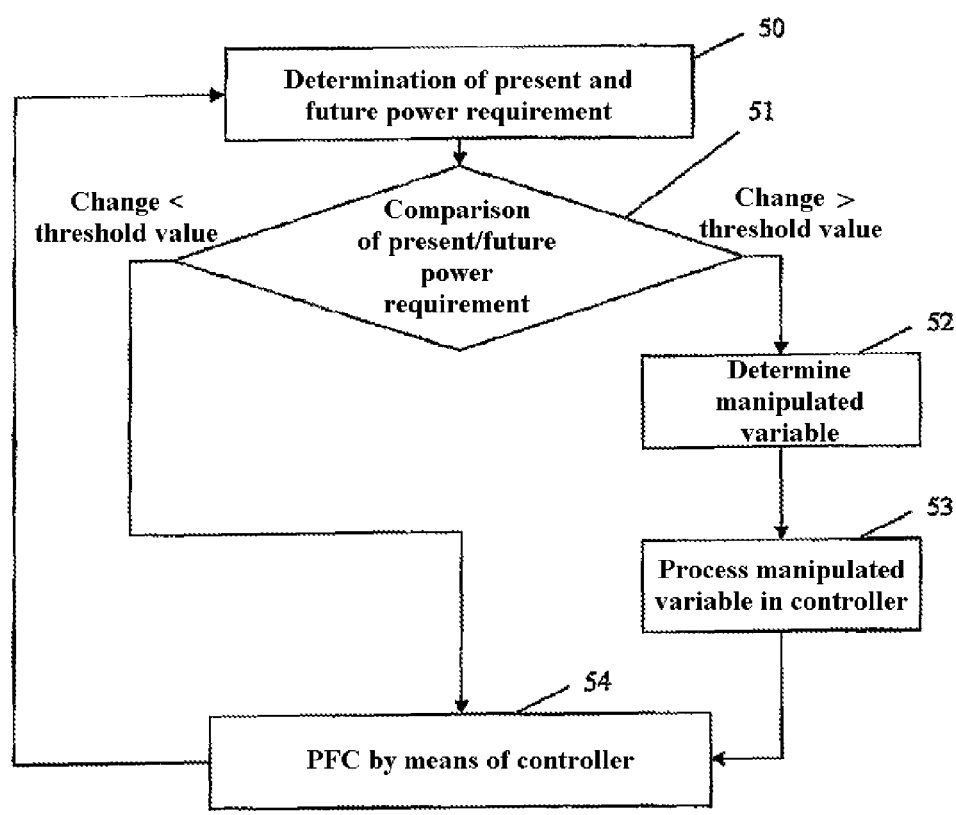
FIG. 2 shows a first exemplary embodiment of the method according to the invention.

FIG. 2 shows a first exemplary embodiment of the method according to the invention for operating a load. In a first step 50, a present power requirement and a future power requirement are determined. This takes place in the case of the circuit arrangement according to the invention by the control unit 16. In this case, only the respective power requirement is communicated by the microcontroller 21.

In a second step 51, the present power requirement and the future power requirement are compared with one another. If the difference is greater than a threshold value, this is detected as a sudden load variation. In this case, the method proceeds with a third step 52. A suitable manipulated variable for compensating for the sudden load variation is determined in this step. This can take place, as already illustrated, by a calculation specification or by reading from a table. This step is performed in the circuit arrangement by the control unit 1.

In a fourth step 53, the just-determined manipulated variable is processed in the controller. That is to say that the feed-forward control replaces the manipulated variable value determined conventionally by the closed-loop control. In a fifth step 54, the power factor correction circuit is controlled. In this case, the manipulated variable from the fourth step 53 is used.

If, in the second step 51, the difference is less than the threshold value, no sudden load variation is detected. In this case, the method proceeds directly with the fifth step 54. After the fifth step 54, the method is begun again with the first step 50. The method illustrated here is repeated as often as desired.

Figure 3:
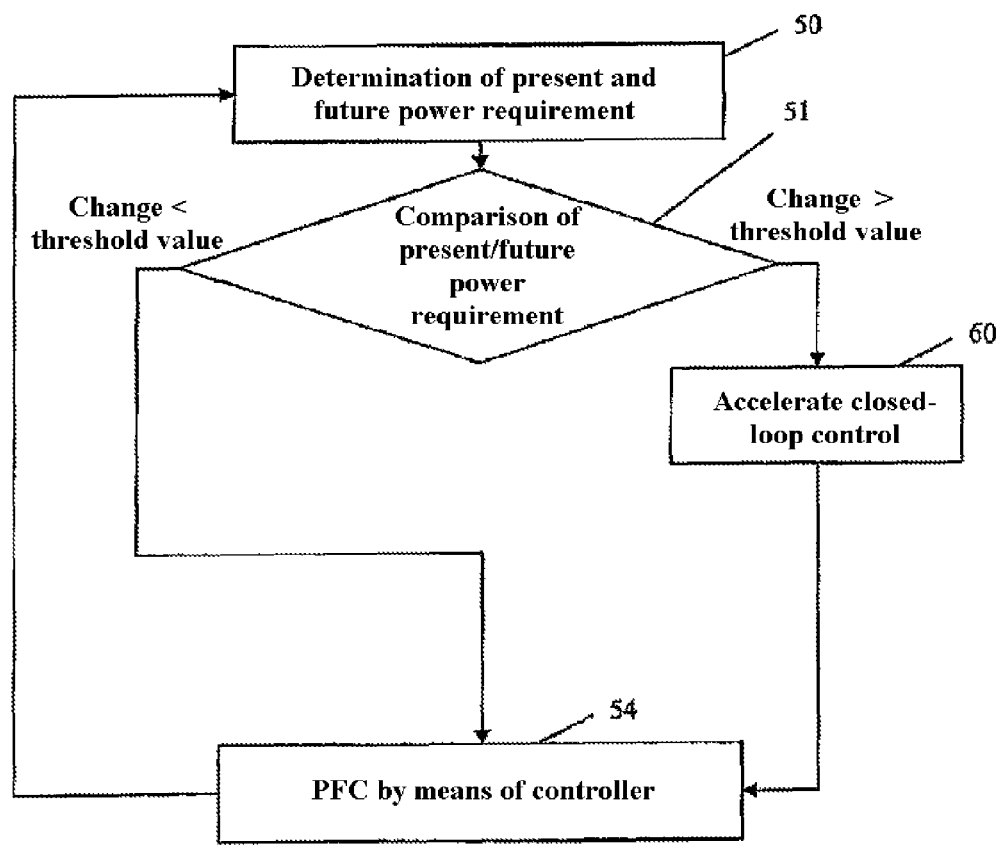
FIG. 3 shows a second exemplary embodiment of the method according to the invention.

FIG. 3 shows a second exemplary embodiment of the method according to the invention. This largely corresponds to the method illustrated in FIG. 3. However, if, in the second step 51, the difference is greater than the threshold value, the closed-loop control is merely accelerated in a third step 60. That is to say that the time constant of the closed-loop control is markedly reduced. After this step 60, the method proceeds with the fifth step 54.

Alternatively, instead of the hard comparison, the method may proceed differently also depending on the difference. Thus, for example, the use of two threshold values is conceivable. The controller operates beneath a first threshold value without any intervention. The closed-loop control is accelerated between the two threshold values. This corresponds to the option illustrated in FIG. 3. Above the upper threshold value, a feed-forward control is implemented, as illustrated in FIG. 2.

The invention is not restricted to the exemplary embodiment illustrated. As already mentioned, very different loads or else a plurality of loads can be used. Also, the use of a switched mode power supply which is different than a power factor correction circuit is also conceivable. All of the above-described features or features shown in the figures can be combined with one another advantageously as desired within the scope of the invention.

What is claimed is:

1. An operating circuit for light-emitting means (18) comprising an actively clocked power factor correction circuit (11), which generates an output voltage ($U_{BUS}$) controlled using a control loop, by means of which output voltage the light-emitting means (18) are supplied indirectly via at least one further converter stage (17),
wherein the control loop has a control unit (16), which, as manipulated variable ($t_{ON}$), drives the clocking of a switch of the power factor correction circuit (11),
wherein the control unit is configured, in the event of the presence of a predefined event selectively:
to vary the value of the manipulated variable ($t_{ON}$) suddenly with feed-forward control, or
to vary the time constant of the control loop of the output voltage ($U_{BUS}$); and wherein the control unit (16) is configured to increase the value of the manipulated variable (tON) suddenly with feed-forward control in the event of the presence of a rapid or sudden increase in the energy requirement of the light-emitting means (18), and to reduce the value of the manipulated variable (tON) suddenly with feed-forward control in the event of the presence of a rapid or sudden reduction in the energy requirement of the light-emitting means (18).

2. The operating circuit as claimed in claim 1, wherein the control unit (16) is configured to determine the value of the manipulated variable ($t_{ON}$) or the time constant of the control loop by means of a calculation specification or by reading from a table in the event of the presence of the predefined event.

3. An operating circuit for light-emitting means (18) comprising an actively clocked power factor correction circuit (11), which generates an output voltage ($U_{BUS}$) controlled using a control loop, by means of which output voltage the light-emitting means (18) are supplied indirectly via at least one further converter stage (17),
wherein the control loop has a control unit (16), which, as manipulated variable ($t_{ON}$), drives the clocking of a switch of the power factor correction circuit (11),
wherein the control unit is configured, in the event of the presence of a predefined event selectively:
to vary the value of the manipulated variable ($t_{ON}$) suddenly with feed-forward control, or
to vary the time constant of the control loop of the output voltage ($U_{BUS}$), and wherein the control unit (16) is configured to reduce the time constant of the control loop of the output voltage ($U_{BUS}$) in the event of the presence of a rapid or sudden increase in the energy requirement of the light-emitting means (18), and to reduce the time constant of the control loop of the output voltage ($U_{BUS}$) in the event of the presence of a rapid or sudden reduction in the energy requirement of the light-emitting means (18).

4. A method for operating light-emitting means (18), wherein a controlled output voltage ($U_{BUS}$) is generated by means of actively clocked power factor correction, by means of which output voltage the light-emitting means (18) are supplied indirectly, wherein a closed-loop control uses, as manipulated variable ($t_{ON}$), the clocking of the power factor correction (11), wherein, in the event of the presence of a predefined event selectively:

changing, suddenly, the value of the manipulated variable ($t_{ON}$) with feed-forward control, or changing the time constant of the control loop of the output voltage ($U_{BUS}$); and wherein a difference between a power consumed at present by the light-emitting means (18) and a power consumed by the light-emitting means (18) after a change in power is formed, and in that the predefined event is detected depending on the difference and wherein the difference is compared with at least one threshold value, and the predefined event is detected depending on the comparison.

5. The method as claimed in claim 4, wherein the time constant of the control loop of the output voltage ($U_{BUS}$) is reduced in the event of the presence of a rapid or sudden increase in the energy requirement of the light-emitting means (18), and the time constant of the control loop of the output voltage ($U_{BUS}$) is reduced in the event of the presence of a rapid or sudden reduction in the energy requirement of the light-emitting means (18).

6. The method as claimed in claim 4, wherein in the event of the presence of the predefined event, the value of the manipulated variable ($t_{ON}$) or the time constant of the control loop are determined by a calculation specification or by reading from a table.

7. A method for operating light-emitting means (18), wherein a controlled output voltage ($U_{BUS}$) is generated by means of actively clocked power factor correction, by means of which output voltage the light-emitting means (18) are supplied indirectly, wherein a closed-loop control uses, as manipulated variable ($t_{ON}$), the clocking of the power factor correction (11), wherein, in the event of the presence of a predefined event selectively:

changing, suddenly, the value of the manipulated variable ($t_{ON}$) with feed-forward control, or changing the time constant of the control loop of the output voltage ($U_{BUS}$); and wherein the value of the manipulated variable ($t_{ON}$) is increased suddenly with feed-forward control in the event of the presence of a rapid or sudden increase in the energy requirement of the light-emitting means (18), and the value of the manipulated variable ($t_{ON}$) is reduced suddenly with feed-forward control in the event of the presence of a rapid or sudden reduction in the energy requirement of the light-emitting means (18).

\* \* \* \* \*